Oct. 23, 1956 H. W. HEMPEL 2,767,981
PUSH BUTTON CONTROL SYSTEM FOR ELECTRICALLY
ACTUATED AND CONTROLLED TAPE MEASURING
AND DISPENSING MACHINES
Filed Dec. 13, 1951 4 Sheets-Sheet 1

INVENTOR:
HERBERT W. HEMPEL,
By Kingsland, Rogers & Ezell
ATTORNEYS.

Oct. 23, 1956 H. W. HEMPEL 2,767,981
PUSH BUTTON CONTROL SYSTEM FOR ELECTRICALLY
ACTUATED AND CONTROLLED TAPE MEASURING
AND DISPENSING MACHINES
Filed Dec. 13, 1951 4 Sheets-Sheet 2

INVENTOR:
HERBERT W. HEMPEL
By Kingsland, Rogers
& Ezell
ATTORNEYS.

Oct. 23, 1956

H. W. HEMPEL

2,767,981

PUSH BUTTON CONTROL SYSTEM FOR ELECTRICALLY
ACTUATED AND CONTROLLED TAPE MEASURING
AND DISPENSING MACHINES

Filed Dec. 13, 1951

INVENTOR:
HERBERT W. HEMPEL,
BY Kingsland, Rogers & Ezell
ATTORNEYS.

United States Patent Office 2,767,981
Patented Oct. 23, 1956

2,767,981

PUSH BUTTON CONTROL SYSTEM FOR ELECTRICALLY ACTUATED AND CONTROLLED TAPE MEASURING AND DISPENSING MACHINES

Herbert W. Hempel, Belleville, Ill., assignor to Marsh Stencil Machine Company, Belleville, Ill., a corporation of Illinois Application December 13, 1951, Serial No. 261,568

14 Claims. (Cl. 271—2.4)

The present invention relates generally to machines for dispensing gummed tape used for packaging purposes, and more particularly to a novel push button control system for electrically actuated and controlled tape measuring and dispensing machines.

The subject matter of the present invention comprises a continuation-in-part of that originally disclosed in applicant's copending application Serial No. 115,238, now Patent No. 2,727,570, filed September 12, 1949.

Briefly, the present invention comprises an electrically actuated and controlled gummed tape measuring and dispensing machine which includes a novel electrical control system adapted to receive a manual indication of the length of tape to be measured and dispensed and, without further attention from the operator, to effect delivery of the desired strip of tape. A set of push buttons is provided for selective manual indication of the length of tape desired.

An object of the present invention is to provide a novel electrical control system adapted to effect automatic operation of a tape measuring and dispensing machine upon manual indication of a desired length of tape to be dispensed.

Another object is to provide a novel electrical control system for tape measuring and dispensing machines which effects automatic completion of a tape measuring and dispensing cycle once it is initiated, and which permits neither overlapping operations nor unintended repeats.

Another object is to provide a novel electrical control system for tape measuring and dispensing machines in which a desired tape increment is indicated and the machine energized through push buttons.

The foregoing and other objects and advantages are apparent from the following description taken with the accompanying drawings, in which.

Referring to the drawings more particularly by reference numerals, 20 indicates generally an electrically actuated and controlled tape measuring and dispensing machine incorporating the concepts of the present invention. The electrical control system shown in Fig. 12 and generally indicated by the letter C is shown incorporated in the machine 20 illustrated in Figs. 1 through 11, although all wiring is omitted in order to clearly present the working parts, the wiring connections being fully disclosed in Fig. 12 which is clearly described below. A modified control system shown in Fig. 13 and generally indicated by the letter D may be substituted for the control system C.

Figures 4, 6, 7, 8, 9, 11:
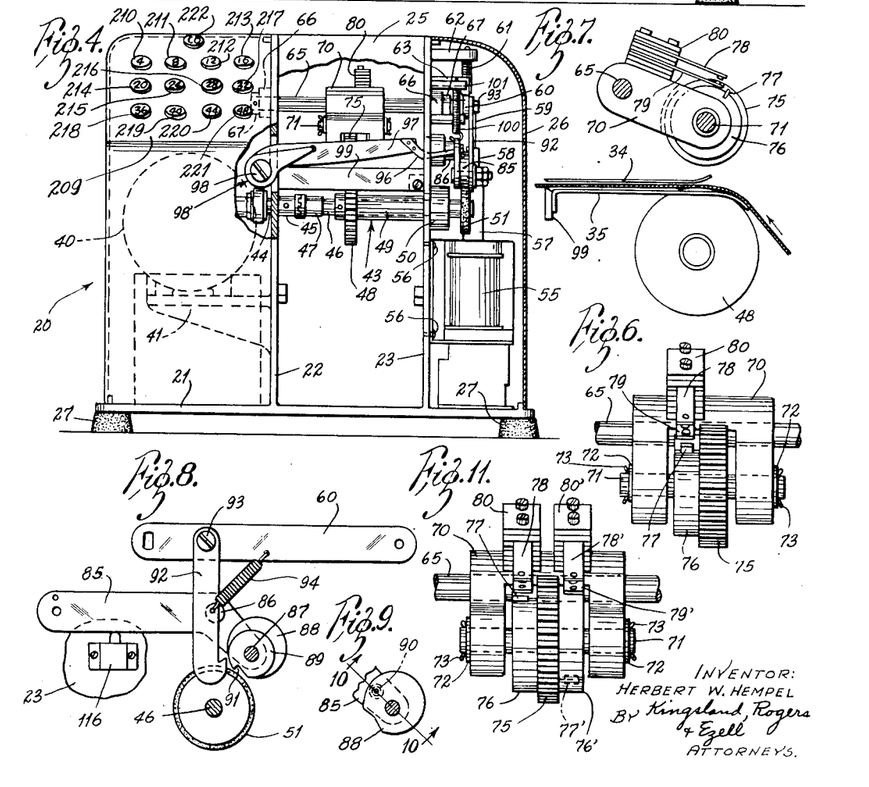
Fig. 4 is a front elevational view thereof, portions of the cover being broken away for purposes of illustrating interior details.
Fig. 6 is a fragmentary enlarged view illustrating the pressure wheel for engaging the upper surface of the tape, together with its supporting yoke and other details.
Fig. 7 is an enlarged fragmentary vertical cross-sectional view illustrating the idle or non-feed relationship of the power driven tape feed wheel and the tape pressure wheel, together with other details.
Fig. 8 is an enlarged fragmentary vertical cross-sectional view illustrating the knife pivoting bell crank and associated elements.
Fig. 9 is an enlarged fragmentary vertical cross-sectional view illustrating one of the elements of the cut-off knife actuating mechanism.
Fig. 11 is a view similar to Fig. 6, illustrating a modified construction.

The machine 20 includes a base plate 21 and integral interior parallel vertical walls 22 and 23. Cover elements 24, 25 and 26 are provided for shielding the working mechanism of the machine 20 which are removably secured in place by any desired means. Rubber feet 27 are secured to and support the base 21. The walls 22 and 23 define in the rear portions thereof a tape roll receptacle 28 in which is shown disposed a tape roll 29. Forwardly of the receptacle 28 and spaced therefrom is a water reservoir 30 within which is removably disposed a tape moistening brush 31. The usual tape guide defining plates 32 and 33 are provided for directing the tape toward and across the top of the brush 31. Rearwardly of the plates 32 and 33 are tape guide defining plates 34 and 35 (Fig. 7). The foregoing elements, in one form or another, are found in tape measuring and dispensing machines.

An electric motor 40 is supported outwardly of the wall 22 upon a bracket 41 welded or otherwise secured to the wall 22. A suitable reduction gear unit 42 is associated with the motor 40 in operative relation with the usual driven shaft thereof.

A composite feed shaft 43 is rotatably supported by and between the walls 22 and 23. The composite shaft 43 includes a stub shaft 44 rotatably mounted in the wall 22, one end of which is operatively connected with the reduction gear unit 42, and the other end of which supports a clutch element 45 secured thereto by a suitable setscrew. Coaxial with the stub shaft 44 is a major shaft element 46 to one end of which is secured by a suitable setscrew a clutch element 47 which engages the aforesaid clutch element 45. A tape feed wheel 48 is secured to the major shaft element 46 by a suitable setscrew, the periphery of the feed wheel 48 being serrated for feeding purposes. A sleeve 49 surrounding the major shaft element 46 spaces the feed wheel 48 from the wall 23. The other end of the major shaft element 46 has bearing support in a bearing 50 secured to the outer surface of the wall 23. A friction drive wheel 51 is secured to the reduced free end of the major shaft element 46, the periphery of which is preferably covered with vulcanized rubber, the purpose and function of the friction drive wheel 51 being set forth below.

Figure 2:
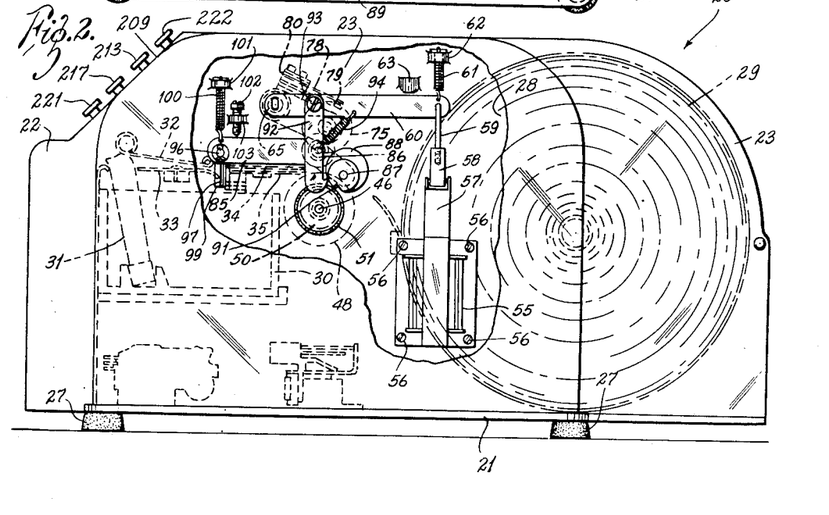
Fig. 2 is a right side elevational view thereof, a portion of the cover being broken away to illustrate the interior mechanism.
Figure 3:
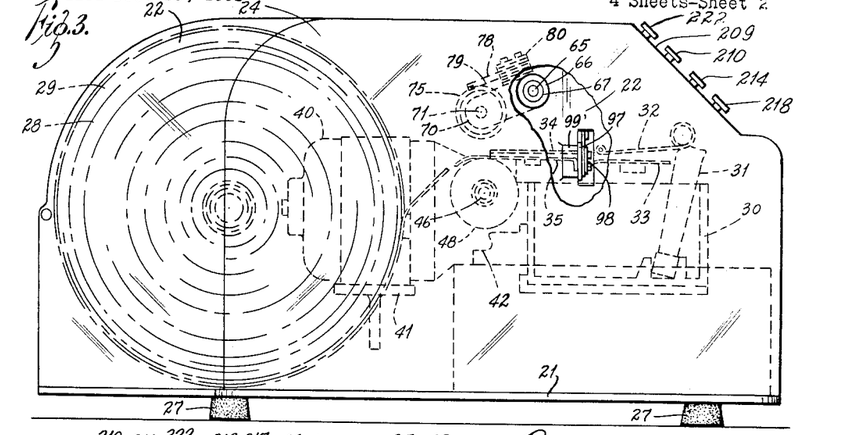
Fig. 3 is a left side elevational view thereof, a part of the cover being broken away to illustrate interior details.

A suitable solenoid 55 is mounted on the outer face of the wall 23 by suitable screws 56 in a position substantially opposite that of the motor 40 (Fig. 2). The solenoid 55 includes a plunger member 57 to the upper end of which is pivotally connected a block 58. An inverted J member 59 threadedly engages the upper end of the block member 58, thus being adjustable vertically, and at its hook end pivotally engages the free end of a pivotally mounted link 60. A tension spring 61 has one end secured to a boss 62 welded or otherwise secured to the outer face of the wall 23, and its other end pivotally connected to the link 60 above and adjacent to the pivotal connection of the J member 59, thus biasing the link 60 counterclockwise. A stop boss 63 extends outwardly from the outer face of the wall 23 for engagement by the link 60 to limit its extreme counterclockwise position of movement. The spring 61 maintains the link 60 against the stop 63 and the plunger 57 of the solenoid 55 withdrawn, as is clearly shown in Fig. 2, when the solenoid 55 is deenergized. The link 60 is secured at its other end to one free end of a rotatable shaft 65 which extends between and through the walls 22 and 23 and is supported in bearings 66.

Figure 1:
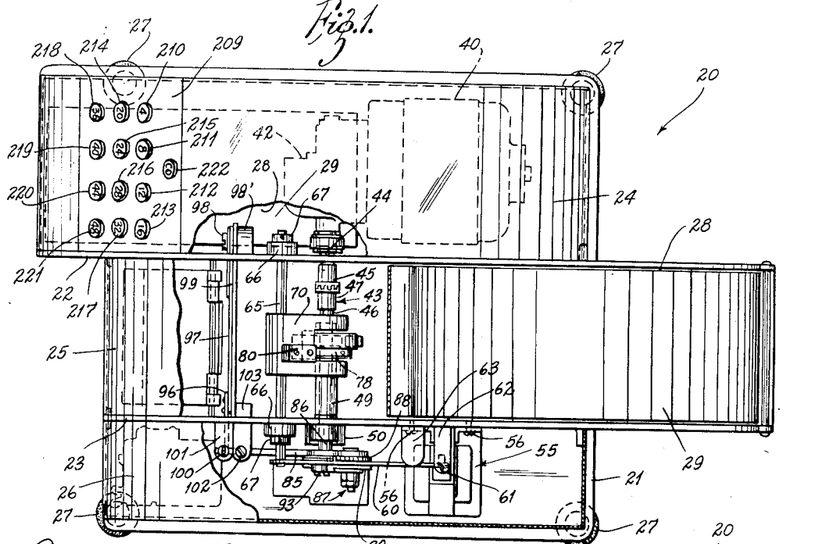
Fig. 1 is a plan view of an electrically actuated and controlled tape measuring and dispensing machine constructed in accordance with the teachings of the present invention, portions of the cover being broken away for purposes of illustrating interior details.

The rotatable shaft 65 is maintained against removal from the bearing 66 by collars 67. A yoke 70 is keyed or otherwise secured to the rotatable shaft 65 and has its legs extending downwardly and rearwardly therefrom, as is clear from Figs. 1 and 2. The legs of the yoke 70 support for free rotation a shaft 71 which is maintained against accidental removal by washers 72 and cotter pins 73 (Figs. 1, 6 and 7). A tape pressure wheel 75 having a serrated periphery is rotatably mounted on the shaft 71 between the legs of the yoke 70 (Fig. 6). A cam 76 in the form of a disc having a peripheral projection 77 of non-conducting material such as micarta, is secured to the pressure wheel 75 for rotation therewith. The pressure wheel 75 and the cam 76 may be keyed or otherwise secured to the shaft 71. Normally open resilient switch blades 78 and 79, each supporting a contact, are mounted on the base of the yoke member 70 through a laminated insulation block 80 and extend into position adjacent the periphery of the cam 76, and are adapted to be moved into closed circuit making position upon engagement of the switch blade 79 by the cam projection 77, which occurs once for each revolution of the pressure wheel 75. The effect of the engagement of the switch blades 78 and 79 is more particularly described below in conjunction with the description of the controlling system C.

Figure 12:
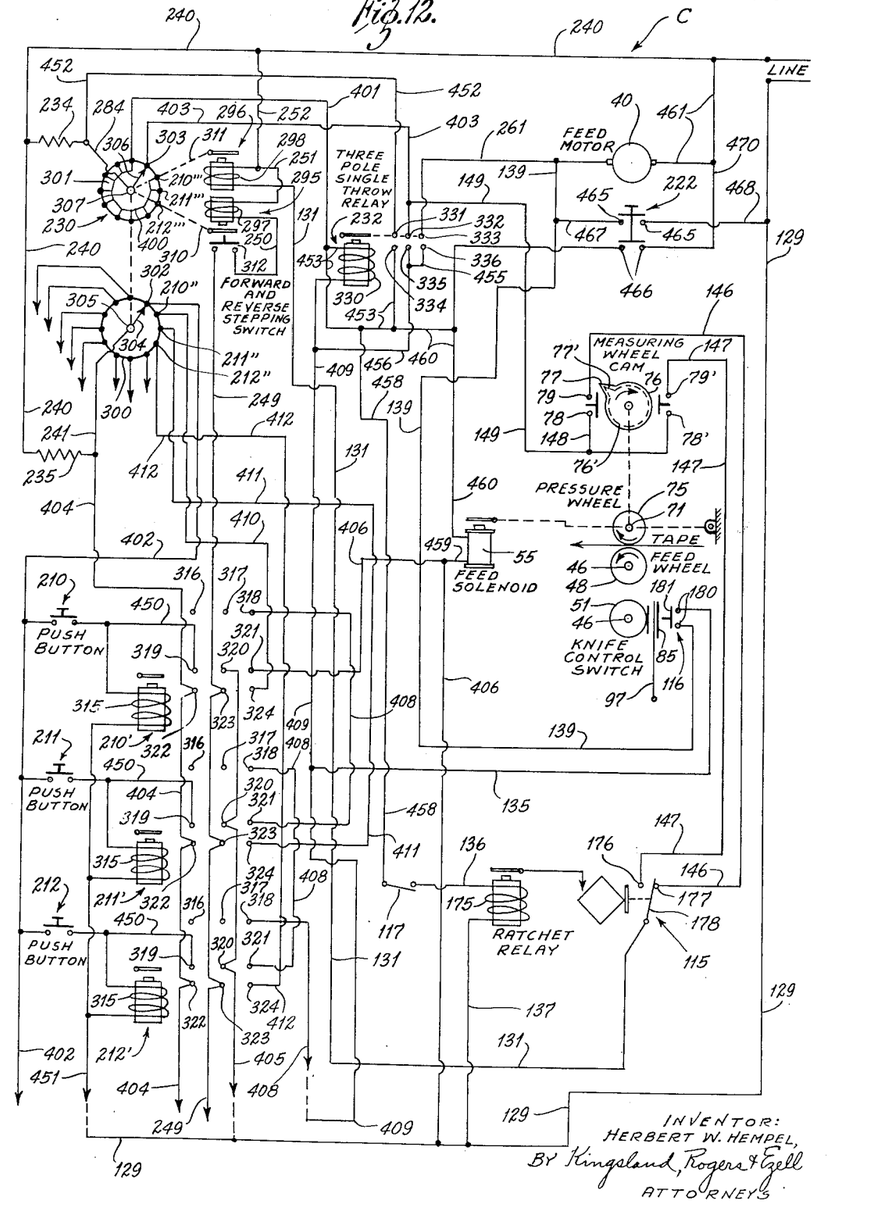
Fig. 12 is a wiring diagram of the control system for actuating the present machine.

An alternate tape pressure wheel construction is shown in Fig. 11 and is incorporated in the wiring diagram of Fig. 12. A second cam 76' is provided which is also secured to the pressure wheel 75, and which has a peripheral projection 77'. Normally open resilient switch blades 78' and 79', each supporting a contact, are mounted on the base of the yoke member 70 through a laminated insulation block 80' and extend into position adjacent the periphery of the cam 76', and are adapted to be moved into closed circuit making position upon engagement of the switch blade 79' by the cam projection 77', which occurs once for each revolution of the pressure wheel 75. The projection 77' is spaced one hundred and eighty degrees from the projection 77 for a purpose described below.

Figures 5, 10:
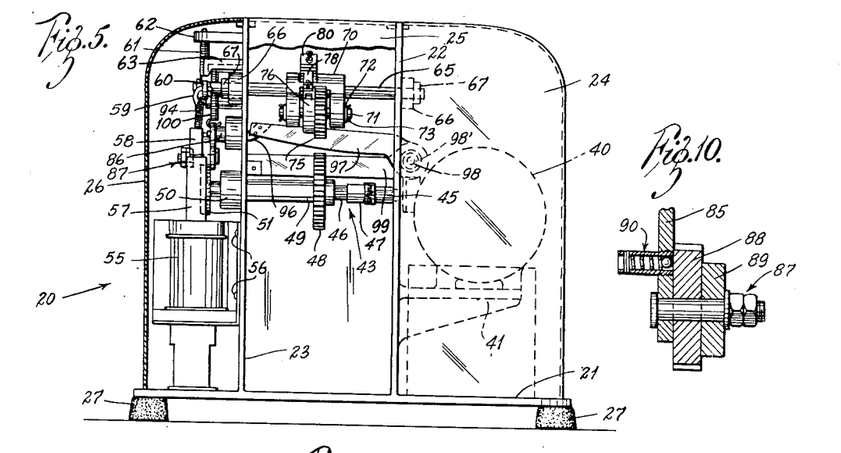
Fig. 5 is a rear elevational view thereof, portions of the cover being broken away to illustrate interior details.
Fig. 10 is a further enlarged cross-sectional view on substantially the line 10—10 of Fig. 9.

A bell crank lever 85 is pivotally mounted beneath the forward portion of the link 60 upon a stub shaft 86 extending outwardly from the outer face of the wall 23, as is clearly illustrated by Figs. 2, 4 and 8. On the free end of the rear arm of the bell crank lever 85 are mounted, for pivotal movement on a nut and bolt assembly 87, a roller 88 having a knurled periphery and a cam 89 (Fig. 10). For stopping the roller 88 in a selected position, there is provided a spring loaded ball detent unit 90 which is mounted in the rear arm of the bell crank lever 85 for engagement of the spring loaded ball thereof with a suitable indentation in the surface of the roller 88. As is clear from Figs. 8 and 9, the roller 88 is mounted off center on the nut and bolt assembly 87 and is cut away at one side. The cam 89 includes a shouldered notch 91 which is engageable by the hook end of a pawl 92 pivotally connected by a screw 93 to the link 60. A tension spring 94, secured to the link 60 and to the pawl 92 as shown in Fig. 8, biases the pawl 92 into engagement with the periphery of the cam 89. The forward end of the bell crank lever 85 pivotally receives in a suitable aperture the free end of an extension member 96 which is secured to the free end of a tape severing pivotally mounted knife blade 97 (Figs. 1, 2 and 4). The knife blade 97 is pivotally mounted at 98 upon a boss 98' welded or otherwise secured to the outer face of the wall 22. The movable knife blade 97 cooperates with a fixed blade 99 secured to and between the walls 22 and 23. A tension spring 100 biases the movable knife blade 97 into the open position shown in Fig. 4 against an adjustable stop 102 threadedly mounted in a boss 103 extending from the wall 23, said spring 100 having its upper end secured to a boss 101 welded or otherwise secured to the outer face of the wall 23 and its lower end engaging a suitable opening at the outer end of the forward arm of the bell crank lever 85.

Referring to Fig. 12, there is shown diagrammatically the above-mentioned electrical control system C. The control system C is of the push button type, and may employ any selected number of push buttons, twelve push buttons 210—221 being shown (Figs. 1 and 4) mounted on a panel 209 secured to the cover element 24. A continuously operating or random button 222 is also shown mounted on the panel 209. In Fig. 12, the circuits for three of the push buttons are disclosed, the circuits for the other push buttons being the same.

The electrical control system C also includes a stepping switch 230, a double throw three-pole relay 210', 211', 212', etc., for each push button 210, 211, 212, etc., respectively, a three-pole single throw relay 232, a double throw single-pole ratchet relay 115, a tape cut-off knife control switch 116, a manual on and off switch 117, the feed solenoid 55, the motor 40, the switch blades 78, 79 and 78', 79', the switches of the push buttons 210, 211, 212, etc., the switch of the continuous operation button 222, resistances 234 and 235, and the necessary leads which interconnect the several elements and tap the power line.

The stepping switch 230 includes a forward stepping relay 295 and a reverse stepping relay 296 of standard construction which include coils 297 and 298, respectively. Two spaced coaxially mounted discs 300 and 301 are provided, the former having peripheral contacts 210'', 211'', 212'', etc., and the latter having peripheral contacts 210''', 211''', 212''', etc., each to the number of push buttons employed with the particular machine 20. Additionally, each of the discs 300 and 301 has a single index or home contact, that for the disc 300 being designated 302 and that for the disc 301 being designated 303. A wiper arm 304 is secured to a shaft extending through the center of the disc 300 and is disposed for engagement with the contacts 210'', 211'', 212'', etc., and the index position 302. The wiper arm 304 is suitably mounted on a contact post 305 to which is connected the lead 241. A wiper arm 306 is secured to the same shaft to which the wiper arm 304 is secured, the shaft extending through the disc 301. The wiper arm 306 is mounted on a contact post 307 to which the lead 284 is connected. The wiper arms 304 and 306 are secured to the shaft in parallel relation so that they engage the respective index positions 302 and 303, respectively, at the same time. The forward and reverse stepping relays 295 and 296 are mechanically connected to the shaft mounting the wiper arms 304 and 306 by the usual pawl and linkage construction as is indicated by the respective broken lines 310 and 311. The relay 295 is adapted to step the wiper arms 304 and 306 simultaneously in a clockwise direction, and the relay 296 effects a similar movement of both arms in a counterclockwise direction. A switch 312, provided in the circuit through the coil 297, is normally closed, but is mechanically opened each time the coil 297 is energized in the stepping action.

The electrical connections for the stepping switch 230 are clearly indicated in Fig. 12. It may be seen that the leads 241 and 284 are connected respectively to the resistances 235 and 234 each of which is in turn connected to a lead 240 and thence to line. The contacts 210″, 211″, 212″, etc. are individually connected by respective leads 410″, 411″, 412″, etc. to separate contacts 324 of respective double throw three-pole relays 210′, 211′, 212′, etc. more particularly referred to below. The contacts 210‴, 211‴, 212‴, etc. are all interconnected by a lead 400 and thence into a lead 401 for a purpose to appear. The contact 302 is connected by a lead 402 to one side of each of the switches 210, 211, 212, etc. The contact 303 is connected by a lead 403 to a contact 332 of the three-pole single throw relay 232 more particularly referred to below. The coils 297 and 298 of the stepping relays 295 and 296 are interconnected by a lead 251 and thence by a lead 252 into the lead 240. The other side of the coil 297 is connected by a lead 250 to one side of the switch 212, the other side of the switch 212 being connected by a lead 249 into each of contacts 323 in the several double throw three-pole relays 210′, 211′, 212′, etc. The other side of the coil 298 is connected by a lead 131 to a movable switch arm 178 of the ratchet relay 115 more particularly referred to below.

Each double throw three-pole relay 210′, 211′, 212′, etc., includes a coil 315 and a switch having upper stationary contacts 316, 317 and 318, movable or throw contacts 319, 320 and 321, and lower stationary contacts 322, 323 and 324. The contacts are connected into the system, as is clearly shown in Fig. 12, certain of the contacts being unused, but required in the standard switch for balance. It will be observed that, in addition to the aforementioned connections of the contacts 323 and 324, the several contacts 322 are interconnected by a lead 404 which is in turn connected to the resistance 235. Also, the several throw contacts 320 are interconnected by a lead 405 which connects with a lead 129 and thence to line. It will be particularly noted that any one of the contacts 321 is connected by a lead 406 into the lead 129, whereas each other contact 321 is separately connected by individual leads 408 to a contact 318 of a different relay 210′, 211′, 212′, etc. The remaining contact 318, which may be any except the one which is directly associated with the aforementioned one contact 321 connected to the lead 406, is connected to a lead 409 for a purpose to appear. The several contacts 316 and 317 are rendered non-conductive, there being no lead connections thereto. Each of the contacts 319 is separately connected by individual leads 450 to a respective push button switch 210, 211, 212, etc., and a separate coil 315 is connected into each of the several leads 450. The other side of each of the coils 315 is connected to a lead 451 which is in turn connected to the lead 129.

The three-pole single throw relay 232 includes a coil 330 and a switch having movable or throw contacts 331, 332 and 333, and stationary contacts 334, 335 and 336. The several contacts 331 through 336 are insulated from each other and are connected as clearly shown in Fig. 12. Thus, in addition to the aforementioned connection of the contact 332 to the lead 403, it will be noted that the contact 331 is connected by a lead 452 to the resistance 234. Additionally, the contact 333 is connected by a lead 261 to the feed motor 40. The contact 334 is connected to a lead 453 which joins the aforementioned lead 401 and is thereafter connected into one side of the coil 330, the other side of the coil 330 being connected by a lead 454 to the aforementioned lead 409. The contacts 335 and 336 are interconnected by a lead 455, the latter being connected by a lead 456 to the lead 409.

The double throw single-pole ratchet relay 115 is of standard construction and includes a coil 175, one side of which is connected to the stationary contact of the on and off switch 117 by a lead 136, and the other side of which is connected by a lead 137 into the lead 129. Two stationary contacts 176 and 177 and a movable contact blade 178 are provided. The contact 176 is connected by a lead 147 to the switch blade 79′ and the other contact 177 is connected by a lead 146 to the switch blade 79. A lead 149 connects the contact 78′ to the lead 403, and a lead 148 connects the contact 78 to the lead 149. As mentioned above, the lead 131 is connected to the movable blade 178. The movable arm of the switch 117 is connected by a lead 458 to the lead 453. As is manifest, the manual on and off switch 117 determines whether or not the ratchet relay 115 is in or out of the operating circuit. When in the operating circuit, the ratchet relay 115 changes polarity each cycle of relay operation to throw the blade 178 back and forth between the contacts 176 and 177, thereby determining which pair of the switch blades 78, 79 and 78′, 79′ is effective for the particular cycle. It is to be noted that the ratchet relay 115 is not employed in a particular machine 20 which uses a single cam 76 and one pair of switch blades 78 and 79 (Fig. 6).

The tape cut-off knife control switch 116 is automatically actuated by the knife linkage at the start of the cut-off action and includes a pair of contacts 180 and a bridge 181, the bridge normally being out of bridging engagement with the contacts 180. A lead 135 connects one contact 180 with the lead 409 and the other contact 180 is connected by a lead 135 to the lead 261 which is connected to one side of the motor 40.

The feed solenoid 55 has one side connected by a lead 459 to the lead 406, and the other side connected by a lead 460 to the lead 453. The side of the motor 40 opposite the aforementioned connection to the lead 261 is connected by a lead 461 to the lead 240.

The switch 222 for continuous operation of the machine 20 is of the double pole single throw type having normally open pairs of contacts 465 and 466, the former pair being connected by leads 467 and 468 to the leads 139 and 129, respectively, and the latter pair being connected by leads 469 and 470 to the leads 460 and 461, respectively.

*Operation*

When the machine 20 incorporating the electrical control system C is at rest, each of the push button switches 210, 211, 212, etc., as well as the continuous operation switch 222, is in a normally opened condition. Additionally, the knife blade 97 is spring-raised to the position shown in Fig. 4, the solenoid 55 and the pressure wheel 75, together with their connecting parts, are in the positions shown in Figs. 2 and 8, and the wiper arms 304 and 306 engage the contacts 302 and 303, respectively. The motor 40 and the solenoid 55 are both deenergized, as are the several relays 210′, 211′, 212′, etc. and also the relays 115, 232, 295 and 296. The resistances 234 and 235 are also deenergized.

Since the numbers on the push buttons 210, 211, 212, etc., are divisible by 4 and begin with the number 4, the pressure wheel 75 has a circumference of four inches, inasmuch as it will be seen that a basic length of tape increment is determined by the circumference of this pressure wheel 75. For different basic lengths of tape increments, it is but necessary to change the size of the pressure wheel 75. Random or continuous dispensing of tape is effected through the use of the continuous operation button 222 and its associated switch.

Assuming, for example, that an eight inch tape increment is to be measured and dispensed by the machine 20 incorporating the control system C, push button 211 is depressed to bridge the contacts of its associated switch, a momentary bridging being sufficient to set the machine 20 into operation to effect the desired cycle. The coil 315 of the relay 211' is thus energized, the circuit being established from line through the lead 129, the lead 451, the coil 315 of the relay 211', the lead 450, the closed switch of the push button 211, the lead 402, the contact 302, the wiper arm 304, the contact post 305, the lead 241, the resistance 235, the lead 240, and back to the other side of the line. This energization of the relay 211' causes its associated contacts 319, 320 and 321, which are in engagement with the upper stationary contacts 316, 317 and 318, respectively, when the coil 315 is deenergized, to be thrown into engagement with the lower stationary contacts 322, 323 and 324, respectively, thereby establishing a holding circuit for the coil 315 through the engaged contacts 319 and 322. The holding circuit is the same as that just traced except that the lead 450 is now connected through the contacts 319 and 322 and the lead 404 directly to the resistance 235. Hence, a momentary closing of the push button 211 is sufficient to set the control system C in operation to effect measuring and dispensing of the selected tape increment. However, inadvertent continuous depression of the push button 211 will not prevent completion of the desired cycle inasmuch as the wiper arm 304 will be immediately removed from the contact 302, as will soon appear, and the previously described starting circuit will be broken at this point.

Engagement of the contacts 320 and 323 closes the circuit through the normally closed switch 312 and the coil 297 of the forward stepping relay 295, the circuit being traced from line through the lead 129, the lead 405, the contacts 320 and 323 of the relay 211', the lead 249, the switch 312, the lead 250, the coil 297, the lead 251, the lead 252, the lead 240, and back to the other side of the line. Energization of the coil 297 effects mechanical movement of the wiper arms 304 and 306 one step. However, as the wiper arms 304 and 306 are mechanically moved forward one step, the switch 312 is mechanically opened by movement of the shaft carrying the wiper arms 304 and 306, thereby deenergizing the coil 297. The switch 312 immediately returns to its normally closed position through spring action or the like, whereupon the coil 297 is again energized to effect mechanically another step of the wiper arms 304 and 306. This action is repeated until the wiper arm 304 engages the contact 211", which, in the instant case, requires only two energizations of the coil 297.

Energization of the relay 211' also effects engagement of the contacts 321 and 324 thereof, thereby completing a partial circuit from one side of the line up to the contact 211", this partial circuit following a path from line through the lead 129, the lead 406, the normally closed contacts 318 and 321 of the relay 210', the lead 408, the now closed contacts 321 and 324 of the relay 211', and the lead 411 to the contact 211". It will thus be seen that the contact 211" is prepared or "armed" simultaneously with the initial actuation of the wiper arm 304. When the wiper arm 304 reaches a position of engagement with the contact 211", the partial circuit just described is completed through the arm 304, the contact post 305, the lead 241, the resistance 235, the lead 240, and back to the other side of the line. As is apparent from Fig. 12, this latter circuit parallels the circuit through the coil 315, and has the effect of short circuiting the latter, thus causing the relay 211' to return to its normal non-operating condition. The resistance 235 prevents damage to the equipment. The duration of the short circuit is only momentary inasmuch as the deenergization of the coil 315 of the relay 211' effects separation of the contacts 321 and 324, thus interrupting the short circuit as soon as it has accomplished its purpose. It will be noted that even though the push button 211 continues to be depressed at this point of the cycle of operation, the coil 315 associated therewith will not be reenergized inasmuch as the wiper arm 304 has been displaced from the contact 302. The holding circuit for the coil 315 is, of course, broken between the contacts 319 and 322, the former having been separated from the latter upon deenergization of the coil 315. A similarly effected separation of the contacts 320 and 323 breaks the circuit through the coil 297 of the relay 295, and it is obvious that the wiper arm 304 is not advanced beyond the particular contact 210", 211", 212", etc., caused to be armed as aforementioned, the particular contact being in the present illustration the contact 211".

As previously described, the wiper arms 304 and 306 are secured together through a common shaft and it is therefore apparent that the aforementioned displacement of the arm 304 from the contact 302 is accompanied by a similar displacement of the arm 306 from the contact 303. Further, it is apparent that engagement of the arm 304 with the contact 211" is accompanied by simultaneous engagement of the arm 306 with the contact 211''', thereby establishing a partial circuit from one side of the line through the lead 240, the resistance 234, the lead 284, the contact post 307, the wiper arm 306, the contact 211''', the lead 400, the lead 401, the lead 453, the coil 330 of the relay 232, the lead 454, the lead 409, and through one or more of the leads 408 and interconnected contacts 318 and 321 of the several relays 210', 211', 212', etc., to the particular contact 318 which is part of the relay 211'. The establishment of this partial circuit is accompanied by the deenergization of the coil 315 of the relay 211', as a consequence of which the contacts 318 and 321 of the relay 211' are closed and this partial circuit extended to completion through these reclosed contacts 318 and 321, and ultimately through the lead 406 and the lead 129 back to the other side of the line. The thus effected energization of the coil 330 of the relay 232 causes the contacts 331, 332 and 333 to close with the contacts 334, 335 and 336, respectively, thereby effecting energization of both the motor 40 and the solenoid 55, as will appear. A holding circuit for the coil 330 is established through engagement of the contacts 331 and 334, the circuit being the same as the one last traced except that the lead 452 and the closed contacts 331 and 334 now provide a direct connection between the resistance 234 and the lead 453. It will be seen that this holding circuit prevents intermittent deenergization of the coil 330 which would otherwise occur as the wiper arm 306 is stepped back toward the contact 303.

It will be noted that the previously described connection between the lead 409 and one side of the line is continuously maintained through the several contacts 318 and 321, except when any pair thereof is caused to open by energization of a coil 315 of one of the relays 210', 211', 212', etc. It is therefore apparent that once a coil 315 has been energized and subsequently deenergized, the lead 409 will remain in direct connection with one side of the line during the remainder of the cycle of operation of the machine 20. Thus, engagement of the contacts 332 and 335 is effective to "arm" the contact 303 and also each of the contacts 78 and 78'. These conditions are brought about by connections of each of these contacts to the lead 409, that from the contact 303 being through the lead 403, the contacts 332 and 335, and the lead 456, and that from the contacts 78 and 78' being through the lead 149, the lead 403, the contacts 332 and 335, and the lead 456.

Energization of the coil 330 of the relay 332 effects simultaneous actuation of the motor 40 and the solenoid 55. A circuit through the motor 40 is completed from the lead 409, connected to one side of the line as aforementioned, through the lead 456, the lead 455, the now closed contacts 333 and 336, the lead 261, the motor 40, the lead 461, the lead 240, and back to the other side of the line. A circuit through the solenoid 55 is completed from the line through the lead 129, the lead 406, the lead 459, the solenoid 55, the lead 460, the lead 453, the now closed contacts 331 and 334, the lead 452, the resistance 234, the lead 240, and back to the other side of the line.

Energization of the motor 40 effects rotation of the feed wheel 48, and energization of the solenoid 55 effects withdrawal of the plunger member 57 thereof against the force of the tension spring 61 to pivot the link 60 clockwise. Clockwise movement of the link 60, in turn, effects clockwise pivotal movement of the yoke 70 and the pressure wheel 75 rotatedly supported thereby. Tape from the roll 29 has been previously pulled across the feed wheel 48 by hand or in previous operations and cut off at the knife 97. The pressure wheel 75 is moved into contact with the tape, pressing it against the feed wheel 48. In the present illustration, the pressure wheel 75 will make two full revolutions in feeding eight inches of tape beyond the knife 97 and across the moistening brush 31. As previously indicated, each revolution of the pressure wheel 75 effects a momentary closure of the switch blades 78, 79, and 78', 79'.

Since both of the contacts 78 and 78' are armed, as aforementioned, the electrically effective pair of switch blades 78, 79 or 78', 79' is determined by the position of the movable switch blade 178 of the ratchet relay 115. In the present illustration, it is assumed that the manual on and off switch 117 is open as shown in Fig. 12 and, hence, the switch blades 78 and 79 are effective. Thus, the cam 76, through its projection 77, closes the switch blades 78 and 79 momentarily at the completion of each revolution of the pressure wheel 75. Each closure of these contacts 78 and 79, therefore, completes the circuit from the previously armed contact 78 through the contact 79, the lead 146, the contact 177, the movable blade 178, the lead 131, the coil 298 of the relay 296, the lead 252, the lead 240, and back to line. Each momentary energization of the coil 298, as thus effected, causes the wiper arms 304 and 306 to be returned toward their respective home contacts 302 and 303 an angular distance equal to that between adjacent peripheral contacts on the discs 300 and 301. In the present illustration, two energizations of the coil 298, corresponding to the aforementioned required two revolutions of the pressure wheel 75, suffice to return the arms 304 and 306 to their home contacts.

As the pressure wheel 75 completes its second revolution and the switch blades 78 and 79 are momentarily closed, the resulting engagement of the wiper arm 306 with the previously armed contact 303 completes a circuit from the contact 303 through the arm 306, the lead 284, the resistance 234, the lead 240, back to the line. As is apparent from Fig. 12, this completed circuit parallels the previously described circuit through the coil 330 of the relay 232 and is effective to short circuit the same. The resistance 234 provides protection for the equipment during the momentary existence of this short circuit, which is terminated by the consequent deenergization of the coil 330 and the resulting separation of the contacts 331, 332 and 333 from the contacts 334, 335 and 336, respectively. Clearly, the separation of these several contacts returns the control system C to its condition of rest.

The cycle of operation is not yet completed, however, for as the solenoid 55 is deenergized, the spring 61 moves the link counterclockwise back to the position shown in Fig. 2. Thereupon the pressure wheel 75 is released from engagement with the tape and, hence, tape feeding stops. However, when the link 60 is in its lowered position, as aforesaid, the pawl 92 is biased by the spring 94 against the cam 89 so that the hook portion thereof engages the shouldered notch 91 of the cam 89. Hence, as the link 60 is returned to its position of Fig. 2, the pawl 92 will rotate the cam 89 a predetermined amount. The cam 89 is fixed to the eccentrically mounted roller 88 so that clockwise rotation of the cam 89 effects the same rotation of the roller 88 which is thereby moved into engagement with the friction drive wheel 51 mounted on the major shaft element 46.

Although the coasting power of the motor 40 is normally adequate to pivot the bell crank lever 85 counterclockwise through engagement of the friction drive wheel 51 with the roller 88 to lower the pivotally mounted knife blade 97 and thus to sever the measured segment of tape, the switch 116 is provided to reenergize the motor 40 as the link 60 begins its return-to-rest travel. In its initial stage of movement, the bell crank lever 85 engages the switch 116 to close the bridge 181 across the contacts 180. This completes a circuit from the lead 409, which it will be noted is still connected as aforementioned to one side of the line, through the lead 135, the switch 116, the lead 139, the lead 261, the motor 40, the lead 461, the lead 240, and back to the other side of the line. This closed circuit reenergizes the motor 40 for the brief period in which the switch 116 remains closed, thereby insuring a complete cut-off of the desired tape segment.

As the eccentrically mounted roller 88 completes its engagement with the friction drive wheel 51, it is stopped in the position shown in Figs. 9 and 10 by the spring-pressed ball detent 90, and the bell crank lever 85 is returned to the position shown in Figs. 2 and 8 against the stop 102 by the tension spring 100. As is clear from Fig. 9, the roller 88 is predeterminately cut away in order not to overdrive the bell crank lever 85 and the knife blade 97.

When the manually operated on and off switch 117 is closed, the ratchet relay 115 is connected in parallel with the feed solenoid 55, the connection being from the lead 129 through the lead 137, the coil 175, the lead 136, the switch 117, and the lead 458 to the lead 453. Hence, it is obvious that the coil 175 will be energized once for each cycle of operation instigated by the pressing of a push button 210, 211, 212, etc. Each time the coil 175 of the relay 115 is actuated, the movable switch blade 178 is drawn from the stationary contact which it engages prior to energization of the coil 175 to engagement with the other stationary contacts. For example, with the on and off switch 117 closed before a push button 210, 211, 212, etc., is depressed to measure and dispense a tape increment, the energization of the coil 175 will cause the movable contact 178 to be removed from the contact 177 and thrown into engagement with the contact 176, thereby taking the switch blades 78 and 79 out of the active circuit and throwing the switch blades 78' and 79' into the active circuit. The switch blades 78' and 79' will be momentarily closed by the projection 77' of the cam 76' after the pressure wheel 75 and the cam 76' have been rotated through only one-half revolution, as is clear from the drawing. Hence, as long as the switch 117 remains closed, the machine 20 will dispense tape segments or increments of two inches, six inches, ten inches, etc., up to forty-six inches for the machine 20 illustrated, since the relay 115 will be actuated for each tape increment selection. Manifestly, the double cam construction shown in Figs. 11 and 12 must be employed for use of the ratchet relay 115 and the manual switch 117.

The random button 222, when pushed inwardly to close the contacts of its double pole switch will effect continuous tape feeding by the motor 40 until released. Closing of the contacts 465 of the switch 222 completes a simple circuit from line through the line 468, the closed contacts 465, the lead 467, the lead 139, the lead 261, the motor 40, the lead 461, the lead 240, and back to the other side of the line. Closing of the contacts 466 of the switch 222 completes a circuit from the line through the lead 129, the lead 406, the lead 459, the solenoid 55, the lead 460, the lead 469, the closed contacts 466, the lead 470, the lead 461, the lead 240, and back to the other side of the line. Thus, both the motor 40 and the solenoid 55 are energized, and remain so until the random button 222 is released, whereupon there ensues the cut-off action previously described including the momentary reenergization of the motor 40.

11

Figure 13:
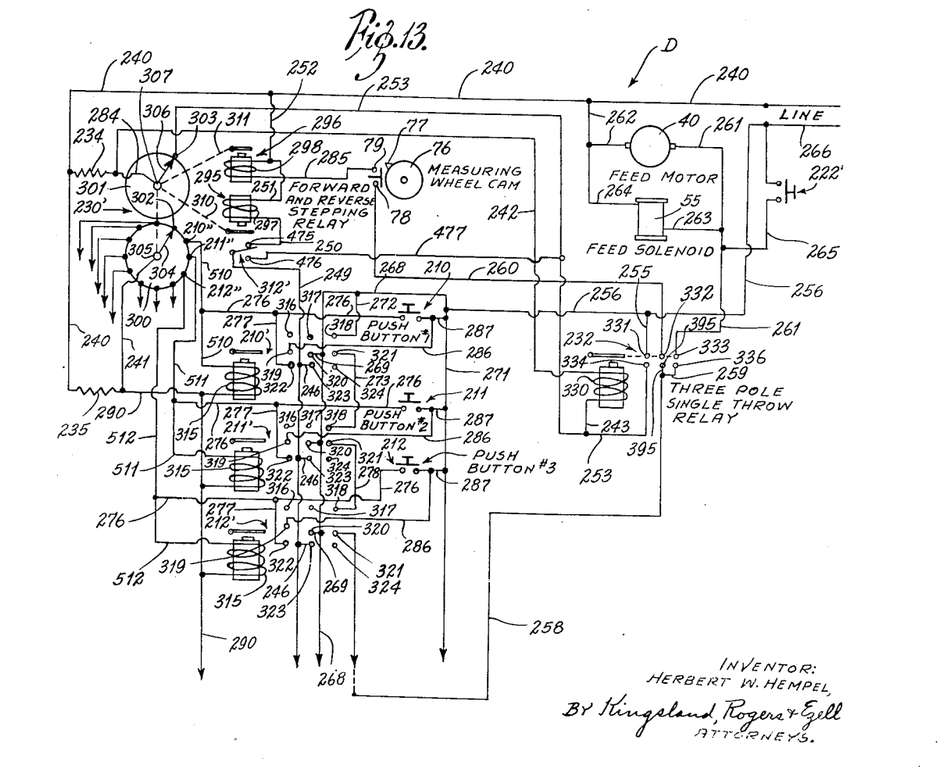
Fig. 13 is a modified wiring diagram of the control system for actuating the present machine.

In Fig. 13, there is disclosed a modified electrical control system D for effecting energization of the motor 40 and solenoid 55 which function in the manner set forth above to cause the several above-described parts of the machine 20 to measure, feed and cut off tape increments. The control system D is also of the push button type, and may employ any selected number of push buttons, such as the twelve push buttons 210—221 and the random buttons 222 shown in Figs. 1 and 4. The random button 222 in the control system D, however, is associated with a single pole switch 222' instead of the double pole switch as in the control system C. In Fig. 13, the circuits for three of the push buttons are disclosed, the circuits for the other push buttons being the same.

The electrical control system D also includes a stepping switch 230' corresponding to the switch 230 of the previously described control system C, a double throw three-pole relay 210', 211', 212', etc., for each push button 210, 211, 212, etc., respectively, a three-pole single throw relay 232, the feed solenoid 55, the motor 40, switch blades 78 and 79, the switches of the push buttons 210, 211, 212, etc., and resistances 234 and 235. Similarly identified elements are identical with their counterparts in the control system C. The stepping switch 230' may be identical with the previously described switch 230, except for the replacement of the single throw switch 312 of the latter with a double throw switch 312'. It will also be noted that the previously described contacts 210''', 211''', 212''', etc., are not depicted in Fig. 13, inasmuch as they have no electrical function in the control system D. The double throw switch 312' has it pole normally in engagement with a contact 475, but is mechanically switched therefrom to a contact 476 each time the coil 297 of the stepping switch 230' is energized in the stepping action.

The electrical connections for the stepping switch 230' are clearly indicated in Fig. 13. It may be seen that the wiper arms 304 and 306 are connected through the resistances 235 and 234 to line in the same manner as for the control system C. The contacts 210'', 211'', 212'', etc., however, are individually connected by respective leads 510, 511, 512, etc., to separate coils 315 of respective double throw three-pole relays 210', 211', 212', etc., the other sides of the coils 315 being connected by a common lead 290 to the resistance 235. It should be particularly noted that the home contact 302 of the disc 300 has no fixed electrical connection thereto and is thus rendered non-conductive in the control system D. The contact 303 is connected by a lead 253 to the contact 334 of the three-pole single throw relay 232. The coils 297 and 298 are connected generally as for the system C, the lead 250, however, being connected to the normally closed contact 475 of the double throw switch 312', and the lead 131 being replaced by a lead 285 connected directly to the measuring switch contact 79. The normally open contact 476 of the switch 312' is connected by a lead 477 into the lead 253. The pole of the switch 312' is connected by the common lead 249 and individual leads 246 into each of the contacts 323 in the several double throw three-pole relays 210', 211', 212', etc.

Each contact 320 of relays 210', 211', 212', etc., is connected by an individual lead 269 into a common lead 268 and thence by a lead 266 to line. The contact 318 of the relay 210' is connected by a lead 272 into the lead 268, but it will be noted that the remaining contacts 318 of the relays 210', 211', 212', etc., are each connected by an individual lead 273 to the contacts 321 of the preceding relay. The contact 321 of the last relay is connected by a lead 258 to the contact 335 of the three-pole single throw relay 232. It will be noted that the contacts 324, in addition to the contacts 316 and 317, remain unconnected in the control system D.

A common lead 271 connected to the aforementioned lead 256 has individual leads 287 connecting one side of each push button switch 210, 211, 212, etc., thereto, and each of the leads 287 is also connected by an individual

12 lead 286 into the contact 319 of the relays 210', 211', 212', etc., associated therewith. The other side of each push button switch is connected by an individual lead 276 to the particular leads 510, 511, 512, etc., associated therewith, and each contact 322 is connected by an individual lead 277 into the appropriate lead 276 as shown.

The coil 330 of the three-pole single throw relay 232 has one side connected by a lead 242 into the resistance 234 and the other side connected by a lead 243 into the aforementioned lead 253. The connections of the contacts 334 and 335 of this relay, having been previously described, it will be noted that the contact 336 is connected by a lead 259 into the aforementioned lead 258 and that the contact 331 is connected by a lead 255 into the aforementioned lead 256. The contact 332 is connected by a lead 260 to the measuring switch contact 78. The contact 333 is connected by the lead 261 into one side of the motor 40, the other side of the latter being connected by a lead 262 into the aforementioned lead 240. The solenoid 55 is connected by means of leads 263 and 264 to the respective leads 261 and 262.

The random button switch 222' has one side connected by a lead 265 into the lead 261 and the other side connected by a lead 266 to one side of the line.

To demonstrate the operation of the electrical control system D, it is assumed that an eight inch tape increment is to be measured and dispensed by the machine 20 incorporating the control system D. The push button 211 is depressed to bridge the contacts of its associated switch, a momentary bridging being sufficient to set the machine 20 into operation to effect the desired cycle. The coil 315 of the relay 211' is energized, the circuit being established from line through the lead 240, the resistance 235, the lead 290, the coil 315 of the relay 211', the lead 511, the appropriate lead 276, the closed switch of the push button 211, the appropriate lead 287, the lead 271, the lead 256, and back to the other side of the line. The movable contacts 319, 320, and 321, which are in engagement with the upper stationary contacts 316, 317, and 318, respectively, when the coil 315 is deenergized, are thrown into engagement with the lower stationary contacts 322, 323, and 324, respectively, thereby establishing a holding circuit for the coil 315 through the engaged contacts 319 and 322. The holding circuit is the same as just traced, except the appropriate leads 286 and 277 connected to the contacts 319 and 322, respectively, carry the current around the opened switch of the push button 211, as is manifest from Fig. 13. Hence, a momentary closing of the push button 211 is sufficient to set the control system D in operation to effect measuring and dispensing of the selected tape increment.

Engagement of the contacts 320 and 323 closes the circuit through the normally closed contact 475 of the switch 312' and the coil 297 of the forward stepping relay 295, the circuit being traced from line through the lead 240, the lead 252, the lead 251, the coil 297, the lead 250, the closed contact 475 of the switch 312', the lead 249, the appropriate lead 246, the contact 323, the contact 320, the appropriate lead 269, the lead 268, the lead 266, and back to the other side of the line.

Energization of the coil 297 effects mechanical movement of the wiper arms 304 and 306 one step. However, as the wiper arms 304 and 306 are mechanically moved forward one step, the contact 475 of the switch 312' is mechanically opened by movement of the shaft carrying the wiper arms 304 and 306, thereby deenergizing the coil 297. The switch 312', however, immediately returns to its normal position through spring action, or the like, whereupon the coil 297 is again energized to effect mechanically another step of the wiper arms 304 and 306. This action is repeated until the wiper arm 304 engages contact 211'', which, in the instant case, requires only two energizations of the coil 297.

Meanwhile, the relay 232 is energized upon the first movement of the pole of the switch 312' from the contact 475 to the contact 476, current flowing from the lead 249 through the momentarily closed contact 476 of the switch 312', and, hence, through the lead 477, the lead 253, the coil 330 of the relay 232, the lead 242, the resistance 234, the lead 240, and back to the other side of the line. Energization of the coil 330 effects closing of the contacts 331, 332 and 333 with the stationary contacts 334, 335, and 336, respectively, thereby preparing a circuit for the subsequent energization of the motor 40 and the solenoid 55. A holding circuit for the coil 330 is established through engagement of the contacts 331 and 334, the circuit being traced from line through the lead 240, the resistance 234, the lead 242, the coil 330, the lead 243, the lead 253, the contact 334, the contact 331, the lead 255, the lead 256, and back to the other side of the line.

When the wiper arm 304 reaches the contact 211", the coil 315 of the controlling relay 211' is short-circuited without damage to the equipment through the resistance 235, the path of the short-circuit being from line through the lead 240, the resistance 235, the lead 241, the contact post 305, the wiper arm 304, the contact 211", the lead 511, the appropriate lead 276, the appropriate lead 277, the contact 322, the contact 319, the appropriate lead 286, the appropriate lead 287, the lead 271, the lead 256, and back to the other side of the line. The coil 315 is deenergized, whereupon the movable contacts 319, 320 and 321 of the relay 211' are thrown back into engagement with the upper stationary contacts 316, 317, and 318, respectively, thereby opening the circuit through the switch 312' and the forward stepping relay 295. The engagement of the contact 321 with the stationary contact 318 now closes the circuit through the motor 40 and the feed solenoid 55, since the previous action had set up the contacts of the relay 232 for this result, as is described above. The circuit through the motor 40 is from line through the lead 240, the lead 262, the motor 40, the lead 261, the contact 333, the contact 336, the lead 259, the lead 258, the several leads 273 and the inner connected contacts 318 and 321 of the relays 210', 211', 212', etc., the lead 272, the lead 268, the lead 256, and back to the other side of the line. The circuit through the solenoid 55 is the same, except that the current passes from the lead 262 through the lead 264 and the solenoid 55 and thence from the solenoid through the lead 263 to the lead 261.

Energization of the motor 40 and the solenoid 55 effects the same mechanical actions in regard to the tape measuring and pressure wheel 75 and the feed wheel 48 as is set out above in connection with the description of the system C. Hence, an eight inch increment of tape is measured between the feed wheel 48 and the pressure and measuring wheel 75, the measuring wheel 75 making two revolutions which effect two revolutions of the cam wheel 76. At the completion of each revolution, the projection 77 on the cam 76 closes the switch blades 79 and 78 momentarily. Closing engagement of the conductive blades 79 and 78 closes a circuit through the coil 298 of the reverse stepping relay 296, the circuit being the same as detailed for the motor 40, except current flows from the lead 240 by the lead 252 through the coil 298, the lead 285, the conductive switch blades 79 and 78, the lead 260, and the closed contacts 332 and 335 to the lead 258. Each time the coil 298 is energized, the reverse stepping relay 296 moves the wiper blades 304 and 306 counterclockwise one position. In the present example, the coil 298 will be energized twice, and, hence, the wiper arm 304 will be mechanically moved counterclockwise from the contact 211" to the neutral index position 302 and the wiper arm 306 will be mechanically returned at the same time to the contact index position 303. As the wiper arm 306 reaches the contact 303, a short-circuit is established through the resistance 234 without injury to the equipment, thereby deenergizing the relay 232, the short-circuit being from line through the lead 240, the resistance 234, the lead 284, the contact post 307, the wiper arm 306, the contact 303, the lead 253, the lead 254, the contacts 334 and 331 of the relay 232', the lead 255, the lead 256, and back to the other side of the line. Deenergization of the coil 330 of the relay 232 effects mechanical breaking of the movable contacts 331, 332, and 333 from engagement with the stationary contacts 334, 335, and 336, respectively, thereby deenergizing the motor 40 and the solenoid 55. Measuring and feeding action immediately ceases, and the coasting power of the motor 40 is sufficient to effect severing action of the tape by the knife 97, which is instigated in the same manner as described above for the control system C. Upon return of the tape severing knife 97 to its inoperative position through spring action, the machine 20 is ready for another tape measuring and feeding operation.

The electrical control system D is illustrated in Fig. 13 in conjunction with a single cam 76 and without the ratchet relay 115 shown in Fig. 12. Manifestly, the double cam construction as illustrated in Fig. 11 in conjunction with the ratchet relay 115 and the switch 117 may be included in system D.

The random button 222, when pushed inwardly to close the contacts of its switch 222' will effect continuous tape feeding by the motor 40 until released. Closing of the switch 222' closes a simple circuit from line through the lead 240, the lead 262, the motor 40, the lead 261, the lead 265, the closed switch 222', the lead 266, and back to the other side of the line. The same circuit is established through the solenoid 55, except the current passes by the lead 264 to the solenoid 55 and thence by the lead 263 to the lead 261. The mechanical closing of the contact blades 79 and 78 by the projection 77 of the cam 76 is ineffective for circuit making, since the coil 330 of the relay 232 is deenergized and the contacts are in open positions.

Both of applicant's push button control systems for electrically actuated and controlled tape measuring and dispensing machines are fast and accurate. Thirty to forty inches of tape may be dispensed per second in a continuous measuring and feeding operation, the moistening of the tape being presently determinative of the speed. The tape must be adequately moistened or it will not stick to the applied package. Short tape increments may be rapidly and accurately dispensed, there being very little overrun, if any, in a particular dispensing operation, accuracy of the increment being held to within a narrow margin less than one-quarter of an inch. Manifestly, the applicant has provided a selection of controls which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention, which is limited only by the claims which follow.

What is claimed is:

1. In a tape measuring and dispensing machine comprising a supporting frame, a tape strip feed roller rotatably mounted thereon, a motor on said frame, means operatively connecting the motor and feed roller for drive of the latter by the former, a tape measuring and presser roller rotatably and swingably mounted on said frame, a solenoid, a linkage connecting the solenoid and the measuring and presser roller for swinging movement of the latter by the former to bring the measuring and presser roller into engagement with a tape strip interposed between the same and the feed roller, and a measuring cam rotatably mounted and connected to the measuring and presser roller for rotation therewith: an electrical control system for effecting sequential energization and deenergization of said motor and solenoid, said system including a plurality of individual electric switches for selecting a tape segment to be measured and dispensed, means selectively responsive to actuation of individual switches for effecting energization of said motor and solenoid to effect tape measuring and feeding, and means responsive to movement of said measuring cam for effecting deenergization of said motor and solenoid upon completion of tape measurement to stop tape feeding.

2. In a tape measuring and dispensing machine comprising a supporting frame, a tape strip feed roller rotatably mounted thereon, a motor on said frame, means operatively connecting the motor and feed roller for drive of the latter by the former, a tape measuring and presser roller rotatably and swingably mounted on said frame, a solenoid, a linkage connecting the solenoid and the measuring and presser roller for swinging movement of the latter by the former to bring the measuring and presser roller into engageemnt with a tape strip interposed between the same and the feed roller, and a measuring cam rotatably mounted and connected to the measuring and presser roller for rotation therewith: an electrical control system for effecting sequential energization and deenergization of said motor and solenoid, said system including tape segment selector means incorporating a plurality of individual electric switches, motor and solenoid circuits adapted to be selectively energized upon actuation of any of said switches to effect measurement and dispensation of a tape strip, and a circuit actuatable by said measuring cam for automatically effecting deenergization of said motor and solenoid circuits upon completion of the measurement and dispensation of the selected tape segment.

3. An electrical control system for tape measuring machines comprising a plurality of tape segment selector units, a stepping switch having a separate contact for each of said units, means connecting each of said separate contacts with a respective one of said units, conducting means having a predetermined starting relation in respect to said separate contacts and consecutively engageable with each of said separate contacts, means for effecting relative movement between said conducting means and said separate contacts, said latter means being operable upon actuation of any one of said selector units to effect engagement of said conducting means with the particular one of said separate contacts connected with the actuated selector unit, a motor circuit, means operable upon the effectuation of said engagement of the conducting means with a particular one of said separate contacts for energizing the motor circuit, means for effecting relative reverse movement between said conducting means and said separate contacts during energization of the motor circuit, means for maintaining the motor circuit energized during said relative reverse movement, and means for deenergizing the motor circuit upon subsequent reestablishment of said starting relation between said conducting means and said separate contacts.

4. The combination of claim 3 with means for energizing the motor circuit independently of the selector units and the stepping switch.

5. The combination of claim 3 wherein said means for energizing the motor circuit comprises electrically actuated switching means having switch contacts for the motor circuit and switch contacts for said means for effecting relative reverse movement.

6. The combination of claim 5 wherein said means for effecting relative reverse movement comprises mechanically actuated switching means adapted for intermittent closure in accordance with the dispensation of predetermined increments of tape.

7. The combination of claim 6 wherein the mechanically actuated switching means comprises two separate switches adapted for alternate operation, and selectively operable means for incorporaing first one and then the other of said two separate switches for effective action in said means for relative reverse movement, said selectively operable means being selectively adapted to function upon each closure of said electrically actuated switching means.

8. An electrical control system for tape measuring and dispensing machines comprising a plurality of push button tape segment selector units, each unit including a push button and push button switch and a double throw multiple pole relay incorporated in a circuit adapted to be completed upon closure of the push button switch thereby to actuate the multiple pole relay, holding means for each multiple pole relay effective to maintain the same in actuated condition upon subsequent opening of the push button switch, a stepping switch having a separate contact for each of said selector units and at least one contact in addition thereto, movable conducting means for contacting each of said contacts consecutively, electrically actuated means effective upon actuation of any of said relays for obtaining relative movement between said conducting means and said separate contacts, means including said conducting means and an appropriate one of said separate contacts for effecting return of an actuated relay to non-actuated condition, relay switching means actuatable through each of said multiple pole relays for controlling associated motor and solenoid circuits, holding means for said relay switching means effective to maintain the same in actuated condition upon subsequent breakage of the original actuating circuit, electrically actuated means for obtaining reverse relative movement between said conducting means and said separate contacts, intermittently operable switching means for controlling the latter of said electrically actuated means, and means including said conducting means and said additional contact for effecting return of said relay switching means to non-actuated condition.

9. An electrical control system for tape measuring and dispensing machines comprising a plurality of push button tape segment selector units, each unit including a push button and push button switch and a double throw three-pole relay having a coil and double throw switch, a stepping switch including a forward stepping relay coil, a reverse stepping relay coil, two spaced coaxially mounted discs, one disc having a single home contact and the other disc having a non-conductive home position and a plurality of annularly disposed contacts equally spaced therefrom, said home contact and home position being located in the same relative positions on said discs, and a wiper arm associated with each disc secured to a common shaft rotatably mounted coaxially with said discs for simultaneous movement relative thereto, said stepping relay coils being mechanically connected to said shaft for rotation by one in a forward direction and by the other in a reverse direction, a double throw switch having a normally closed contact and a normally open contact, said double throw switch being adjacent said reverse coil and adapted to be actuated thereby on energization thereof, a single throw three-pole relay including a coil and a three contact switch, a motor circuit, a solenoid circuit, a rotatably mounted measuring wheel cam, a switch closed momentarily by said cam at each revolution thereof, each push button switch being in a circuit with its respective associated coil so that closing of a selected push button switch effects energization of its associated coil and resultant throw of the double throw three-pole switch which the coil actuates, a holding circuit for each three-pole relay coil established upon throw of the associated three-pole switch, a circuit including said forward stepping relay coil and the normally closed contact of the aforementioned adjacent double throw switch established upon throw of the selected three-pole switch to effect forward stepping action of said wiper arms until the concerned contact on said other disc corresponding to the tape segment to be measured and dispensed is reached by the respective wiper arm, a circuit including said coil of said single throw three-pole relay closed upon actuation of said adjacent double throw switch, a holding circuit for said coil of said single throw three-pole relay rendered effective upon energization of said coil, throw of said single throw three-pole relay preparing said motor and solenoid circuits for subseqent energization, a circuit for shorting said selected double throw three-pole relay coil including said wiper arm adjacent said multi-contact disc effective upon said wiper arm reaching the concerned contact, said prepared motor and solenoid circuits being completed upon deenergization of said concerned double throw three-pole coil and return throw of said concerned associated switch, a circuit through said cam closed switch and said reverse stepping relay coil rendered operative upon throw of said single throw three-pole switch, and a circuit for shorting said single throw three-pole relay coil including said wiper arm of said single contact disc rendered effective upon return to home position of said just mentioned wiper arm to effect deenergization of said single throw three-pole relay coil and subsequent deenergization of said motor and solenoid circuits.

10. An electrical control system for tape measuring and dispensing machines comprising a plurality of push button tape segment selector units, each unit including a push button and push button switch and a double throw three-pole relay having a coil and double throw switch, a stepping switch including a forward stepping relay coil, a reverse stepping relay coil, a first and a second disc, said discs being mounted in spaced coaxial relation and each having a plurality of annularly disposed contacts including a home contact, a first and second wiper arm associated with said discs respectively and secured to a common shaft rotatably mounted coaxially with said discs for simultaneous movement relative thereto, said stepping relay coils being mechanically connected to said shaft for rotation by one in a forward direction and by the other in a reverse direction, a normally closed switch adjacent said reverse coil opened thereby on energization thereof, a single throw three-pole relay including a coil and a three contact switch, a motor circuit, a solenoid circuit, a rotatably mounted measuring wheel cam, a switch closed momentarily by said cam at each revolution thereof, each push button switch being in a circuit with its respective associated coil so that closing of a selected push button switch effects energization of its associated coil and resultant throw of the double throw three-pole switch which the coil actuates, a holding circuit for each three-pole relay coil established upon throw of the associated three-pole switch, a circuit including said forward stepping relay coil and the normally closed adjacent switch established upon throw of the selected three-pole switch to effect forward stepping action of said first wiper arm until a concerned contact on said first disc corresponding to the tape segment to be measured and dispensed is reached by the first wiper arm, a circuit for shorting said selected double throw three-pole relay coil including said first wiper arm effective upon the same reaching the concerned contact, a circuit including said coil of said single throw three-pole relay, said second wiper arm, and any of said contacts on said second disc except said home contact thereon closed upon deactivation of said coil of the double throw three-pole relay and resultant return throw of the double throw three-pole switch, a holding circuit for said coil of said single throw three-pole relay rendered effective upon energization of said coil, said motor and solenoid circuits being completed upon coexistent energization of said coil of the single throw three-pole relay and deenergization of said coil of the double throw three-pole relay, a circuit through said cam closed switch and said reverse stepping relay coil rendered operative upon throw of said single pole three-way switch, and a circuit for shorting said single throw three-pole relay coil including said second wiper arm rendered effective upon return of the same to said home contact on said second disc to effect deenergization of said single throw three-pole relay coil and resultant deenergization of said motor and solenoid circuits.

11. The combination of claim 10 with a knife control switch, a circuit including said knife control switch and said motor circuit for energizing the latter upon actuation of the former, a double pole switch, and two isolated circuits through said double pole switch including said motor and solenoid circuits, respectively, for simultaneously energizing said latter circuits upon actuation of said double throw switch.

12. In a tape measuring and dispensing machine having power operated means for advancing a tape strip, an electrical control system comprising tape segment selector means including a plurality of individual electric switches, an individual electric relay in circuit with each switch, a forward stepping relay, and a multiple contact switch connected for operation by the forward stepping relay, each of said individual electric relays being connected both with said forward stepping relay and with a respective contact on said multiple contact switch, tape segment measuring means including a measuring wheel cam, a measuring switch operated by the measuring wheel cam, and a reverse stepping relay connected for actuation through said measuring switch, said reverse stepping relay being also mechanically connected with said multiple contact switch for operating the latter, and a power relay connected with said measuring switch and being selectably connectible with each of said tape segment selector relays for predeterminately sequentially energizing and deenergizing power circuits controlling the advancement of tape in the machine.

13. In an automatic tape measuring and dispensing machine comprising tape feeding and measuring mechanism and electrically powered means for actuating the same: an electrical control system comprising a plurality of individual switches for use in selecting corresponding lengths of tape to be measured and dispensed, a multiple contact switch having a different contact connected to each of said individual switches, a movable arm for the multiple contact switch engageable in consecution with said contacts, means responsive to actuation of any selected one of said individual switches for advancing said arm over said contacts from a starting position, relay switch means responsive to engagement of said arm with the particular one of said contacts connected to the selected individual switch for energizing the electrically powered means which actuates the feeding and measuring mechanism, means including cam operated switch means actuated by the feeding and measuring mechanism for returning said arm to its starting position, and switch means operable upon return of said arm to its starting position to deenergize said relay switch means and hence said electrically powered means.

14. The electrical control system of claim 13 wherein the means for returning said arm to its starting position includes two cam operated switches arranged to be actuated alternately by the feeding and measuring mechanism, and selectively operable means for employing either one or the other to control the return movement of the multiple contact switch arm and thus provide an alternate choice of tape lengths available upon actuation of any of the aforesaid individual switches.

References Cited in the file of this patent

UNITED STATES PATENTS

| | | |
|---|---|---|
| 1,732,635 | Chabot | Oct. 22, 1929 |
| 1,960,945 | Krueger | May 29, 1934 |
| 1,981,229 | Gillet | Nov. 20, 1934 |
| 2,258,912 | Steen et al. | Oct. 14, 1941 |
| 2,408,363 | Beckman et al. | Oct. 1, 1946 |
| 2,417,593 | Farrow | Mar. 18, 1947 |
| 2,427,602 | Helsel | Sept. 16, 1947 |
| 2,468,772 | Mungall | May 3, 1949 |
| 2,629,440 | Shaw et al. | Feb. 24, 1953 |
| 2,643,792 | Daley et al. | June 30, 1953 |
| 2,655,372 | Hempel | Oct. 13, 1953 |